US012370721B2

(12) United States Patent
Davies

(10) Patent No.: US 12,370,721 B2
(45) Date of Patent: Jul. 29, 2025

(54) SOLUTION DISPENSING SYSTEM INTO A CONCRETE MIXING TRUCK AND METHOD THEREOF

(71) Applicant: SILVERFIN RMC CORP., Dana Point, CA (US)

(72) Inventor: Michael Davies, Dana Point, CA (US)

(73) Assignee: Silverfin RMC Corp., Dana Point, CA (US)

( * ) Notice: Subject to any disclaimer, the term of this patent is extended or adjusted under 35 U.S.C. 154(b) by 512 days.

(21) Appl. No.: 17/561,338

(22) Filed: Dec. 23, 2021

(65) Prior Publication Data

US 2022/0193949 A1 Jun. 23, 2022

Related U.S. Application Data

(60) Provisional application No. 63/130,252, filed on Dec. 23, 2020.

(51) Int. Cl.
*B28C 7/12* (2006.01)
*B28C 7/04* (2006.01)

(52) U.S. Cl.
CPC ............ *B28C 7/126* (2013.01); *B28C 7/0486* (2013.01)

(58) Field of Classification Search
CPC .............................. B28C 7/126; B28C 7/0486
See application file for complete search history.

(56) References Cited

U.S. PATENT DOCUMENTS 3,188,238 A * 6/1965 Lyon ........................ B08B 9/093 134/171
5,718,382 A * 2/1998 Jaeger ................... B08B 9/0936 239/227
5,718,508 A * 2/1998 Williams ............ B01F 35/1453 366/50
6,192,905 B1 * 2/2001 Mincy ..................... B08B 9/093 134/167 R (Continued)

FOREIGN PATENT DOCUMENTS

CA 2567719 A1 * 3/2008 ............... B08B 3/02
CA 2992490 A1 * 9/2018 ......... B05B 13/0278

(Continued)

OTHER PUBLICATIONS

Machine Translation of CN-208410243 to Zhang, Jan. 2019. (Year: 2019).*

*Primary Examiner* — Benjamin L Osterhout
(74) *Attorney, Agent, or Firm* — Innovent Law P.C.; Karima F. Gulick

(57) ABSTRACT

A solution dispensing system for injecting a fluid into a concrete mixing container, comprising of a sled including a housing; at least one spray head; a solution line coupled to the housing and to the spray head adapted to spray fluid into the concrete mixing container; a support structure adapted to attach to an external rigid frame and aligned with a hopper of the concrete mixing container; a guiding mechanism facilitating a raising and a lowering of the sled into the hopper of the concrete mixing container; and a supply source including a container and a pump adapted to regulate a flow of the fluid in the solution line where the sled is lowered into the hopper of the concrete mixing container and the fluid is delivered to a drum of the concrete mixing container through the spray head.

15 Claims, 15 Drawing Sheets

(56) References Cited

U.S. PATENT DOCUMENTS

| | | | | |
|---|---|---|---|---|
| 9,370,801 | B1 * | 6/2016 | Short, Jr. | B01F 29/63 |
| 11,090,700 | B1 * | 8/2021 | Camell | B08B 9/093 |
| 2018/0222451 | A1 * | 8/2018 | McNeilus | B08B 9/093 |
| 2020/0223402 | A1 * | 7/2020 | Shumaker | B60S 3/04 |
| 2022/0040741 | A1 | 2/2022 | Davies | |

FOREIGN PATENT DOCUMENTS

| | | | | |
|---|---|---|---|---|
| CN | 208410243 | U * | 1/2019 | |
| WO | WO-03061925 | A1 * | 7/2003 | B01F 15/00032 |

* cited by examiner

SOLUTION DISPENSING SYSTEM INTO A CONCRETE MIXING TRUCK AND METHOD THEREOF

CROSS-REFERENCE TO RELATED APPLICATIONS

This application incorporates by reference and claims the benefit of priority to U.S. Provisional Application 63/130,252 filed on Dec. 23, 2020.

BACKGROUND OF THE INVENTION

1. Field of the Invention

This invention relates to a system and method for dispensing a solution into a concrete mixing truck generally and a solution and method for evenly dispensing a solution into a concrete mixing truck drum in particular.

2. Description of the Related Art

In the market today, there are no optimized solution dispensing systems inside a concrete mixing truck. Some manual solutions to this problem create an extensive risk of injury to the user as well as risk of damaging expensive concrete mixing trucks. Other fully automated solutions can be extremely cost prohibitive.

Currently, there are no useful alternatives which are affordable and reliable, making it difficult for concrete mixing truck owners to properly maintain and care for their machinery.

SUMMARY OF THE INVENTION

The present disclosure is directed to systems and methods of a solution dispensing system for concrete mixing trucks. One advantage of the present solution delivery system is its ability to utilize existing wash out station frames and attach the solution delivery system to an already existing structure eliminating the need of installing and carrying bulky equipment. Another advantage of the present system is its ability to evenly deliver a non-stick coating solution to the inside of a truck drum thereby maximizing load efficiency, maximizing fuel efficiency, eliminating overloading, spillage and highway fines caused by drum build up, increasing the life of the truck concrete mixing drum, reducing cleaning time and water use, and increasing safety and reducing risk injury by having a system that sits into a hopper of a concrete mixing truck and delivers fluids to the inside of the drum of the concrete mixing trucks.

The present disclosure also prevents multiple stops and travels of the concrete mixing trucks for maintenance. In fact, when the solution delivery system is used at already established wash out stations, maintenance time, fuel consumption and driving labor can be cut down. It is also expensive to move concrete mixing trucks from one location to another, so using existing wash stations for delivering other maintenance solutions and fluids can be extremely beneficial.

In one aspect, the present disclosure is embodied as a solution dispensing system for injecting a fluid or a solution into a concrete mixing container. The system comprises a sled which includes a housing, at least one spray head coupled to the housing, a solution line coupled to the housing and to the spray head. The spray head can be adapted to spray a fluid or solution into the concrete mixing drum. A plurality of coupling means can be used to attach the sled to a guiding mechanism, which helps raise and lower the sled into a hopper of the concrete mixing truck. The system can also include a support structure adapted to attach to an external rigid frame. The support structure can terminate on one end in a bracket vertically aligned with a hopper of the concrete mixing container. The guiding mechanism can include cables and pulleys and a control module to better guide the lowering and raising of the sled into the truck hopper. The solution line can be coupled to a fluid supply source which comprises a container adapted to receive the fluid and a pump adapted to regulate a flow of the fluid. The sled can be lowered to a truck hopper and a fluid can be delivered to a drum of the concrete mixing container through the spray head.

In an example, the solution line coupled to the housing is divided into at least two valves terminating in at least two spray heads where a first spray head is adapted to deliver the fluid into the back of the concrete mixing container while a second spray head is adapted to deliver the fluid at an angle and onto a wall of the concrete mixing container such that when the concrete mixing container rotates, the fluid is evenly delivered to all walls of the mixing container.

In an example, the spray heads are drip-proof spray heads and can be rotating spray heads further adapted to deliver the fluid to the entirety of the walls of the mixing container. In another embodiment, a fitting securing the spray head to the sled is welded onto the housing to avoid foreign debris.

In an example, the sled is attached to the guiding mechanism by a chain, a cable, and/or a pulley system. The sled can include a wheel coupled to a bottom face of the housing for proper positioning into the hopper and to avoid friction inside the hopper once the sled is lowered into the hopper. This allows proper positioning of the sled inside the hopper.

In an example, the guiding mechanism includes a cable, a pulley system, chains, adjustment means, clips adapted to guide the sled vertically into the hopper, and/or a directional mechanism for lowering and raising the sled into the hopper.

In an example, the solution dispensing system has a directional mechanism including an actuator, a pneumatic actuator, an electric actuator, a hydraulic actuator and/or a reel and a control module to better control the lowering and raising of the sled into the hopper, and to start, stop and/or pause the delivery of the fluid into the concrete mixing truck. The system can also be adapted to control an amount of fluid dispensed and a time of dispensing the fluid. In an example, a flow-meter and/or a timer can be used to adjust an amount of fluid dispensed and time of fluid dispensed.

In an example, the solution dispensing system also includes a hose management assembly including at least one of a semi-rigid pole coupled to the frame and coupling means to avoid an entanglement of the solution line.

In an example, the solution dispensing system also includes positioning means such as a visual cue, a water sock, a rail, a median, a bump stop, a curb, a laser, a mirror and/or a sensor to facilitate proper alignment of the solution dispensing system with an external concrete mixing truck, the hopper and the concrete mixing container. In an example wherein pre-existing wash stations are used, the visual cue can be the water sock of the wash station. A truck driver may need to align the truck hopper with the water sock to ensure that the solution dispensing system is properly aligned with the truck for fluid delivery.

The present disclosure can be embodied in a method of dispensing a solution into a concrete mixing container including the steps of aligning a hopper of a concrete mixing truck with a positioning means of a dispensing solution system; lowering a sled of the dispensing solution system into the hopper; activating a pump and delivering a fluid into a drum of the concrete mixing truck; adjusting a flow and a quantity of fluid; stopping the flow of fluid after a desired quantity of fluid is reached; and raising and removing the sled from the hopper and from the external concrete mixing truck. In an example, the method also includes the steps of attaching a support structure to an external frame, and coupling the sled to the support structure.

In an example, the present solution dispensing system utilizes ready-mix truck wash out stations and its pipe structures as a mounting base for the system. The wash out structures can be located at every ready-mix plant and supply water to the truck drums that are rotated like a washing machine for cleaning purposes. In an example, utilizing existing wash system structures offers an optimal place to mount the system considering that application is done immediately after the wash out. This saves considerable time and costs of a new structure and if utilizing this existing structure to support the present disclosure. The system can include a sled which can be lowered into the hopper after the wash out is complete. Once the sled has been lowered into place the spray cycle begins and coats the inside of the truck mixer while resting in the hopper, not in the drum. When done, the sled of the solution dispensing system can be automatically raised back into its resting position behind the water sock at the top of the pipe.

Before explaining the various embodiments of the invention in detail, it is to be understood that the invention is not limited in its application to the details of construction and to the arrangements of the components set forth in the following description or illustrated in the drawings. Rather, the invention is capable of other embodiments and of being practiced and carried out in various ways. Also, it is to be understood that the terminology employed herein is for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be made to the accompanying drawings and descriptive matter in which there are illustrated preferred embodiments of the invention.

Various objects, features, aspects and advantages of the present embodiment will become more apparent from the following detailed description of embodiments of the embodiment, along with the accompanying drawings in which like numerals represent like components.

BRIEF DESCRIPTION OF THE DRAWINGS

It should be noted that the figures may be in simplified form and might not be to precise scale.

The same elements or parts throughout the figures of the drawings are designated by the same reference characters, while equivalent elements bear a prime designation.

DETAILED DESCRIPTION OF THE INVENTION

Figure 1:
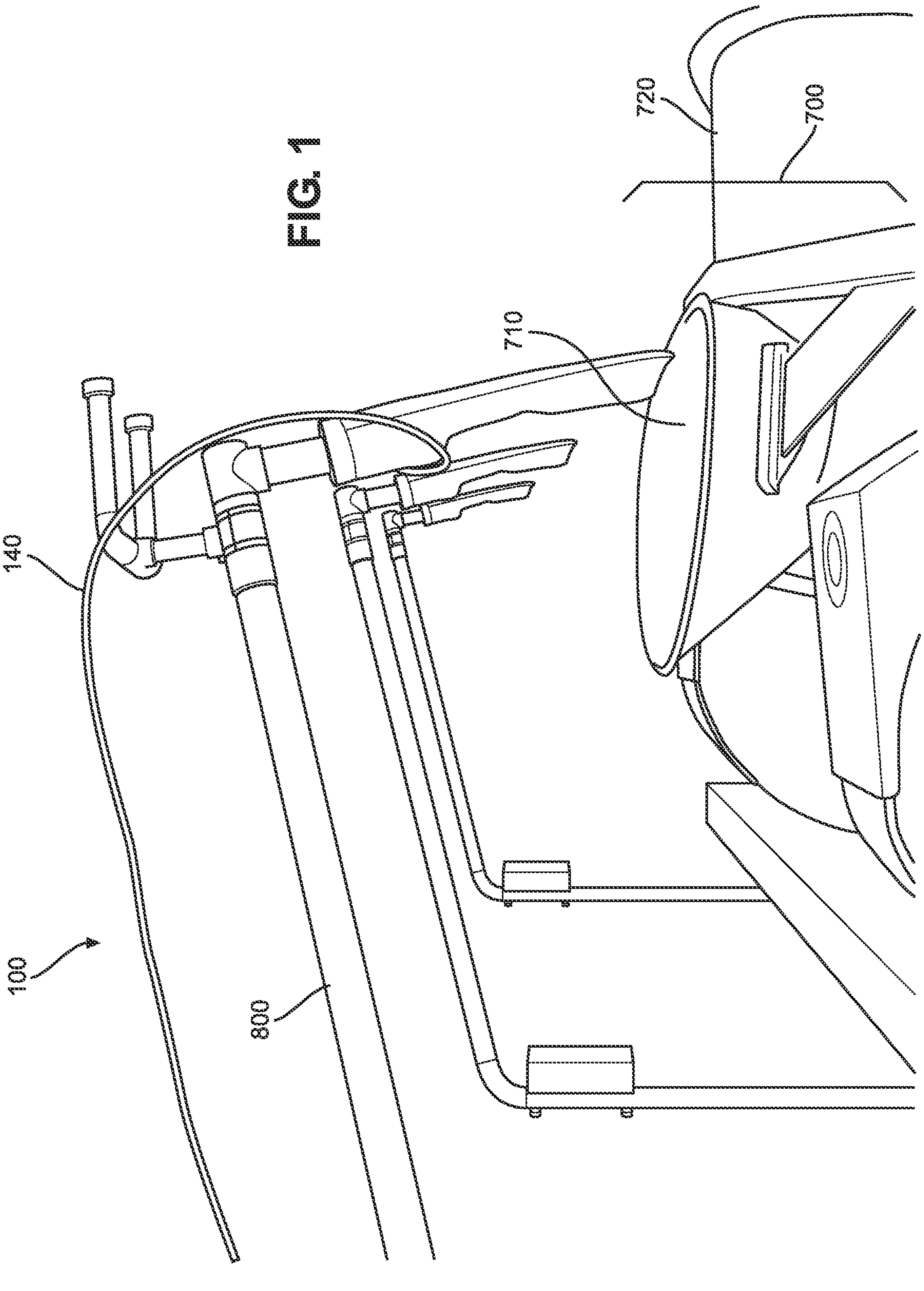
FIG. 1 is a side perspective view of one embodiment of the solution dispensing system.
Figure 2:
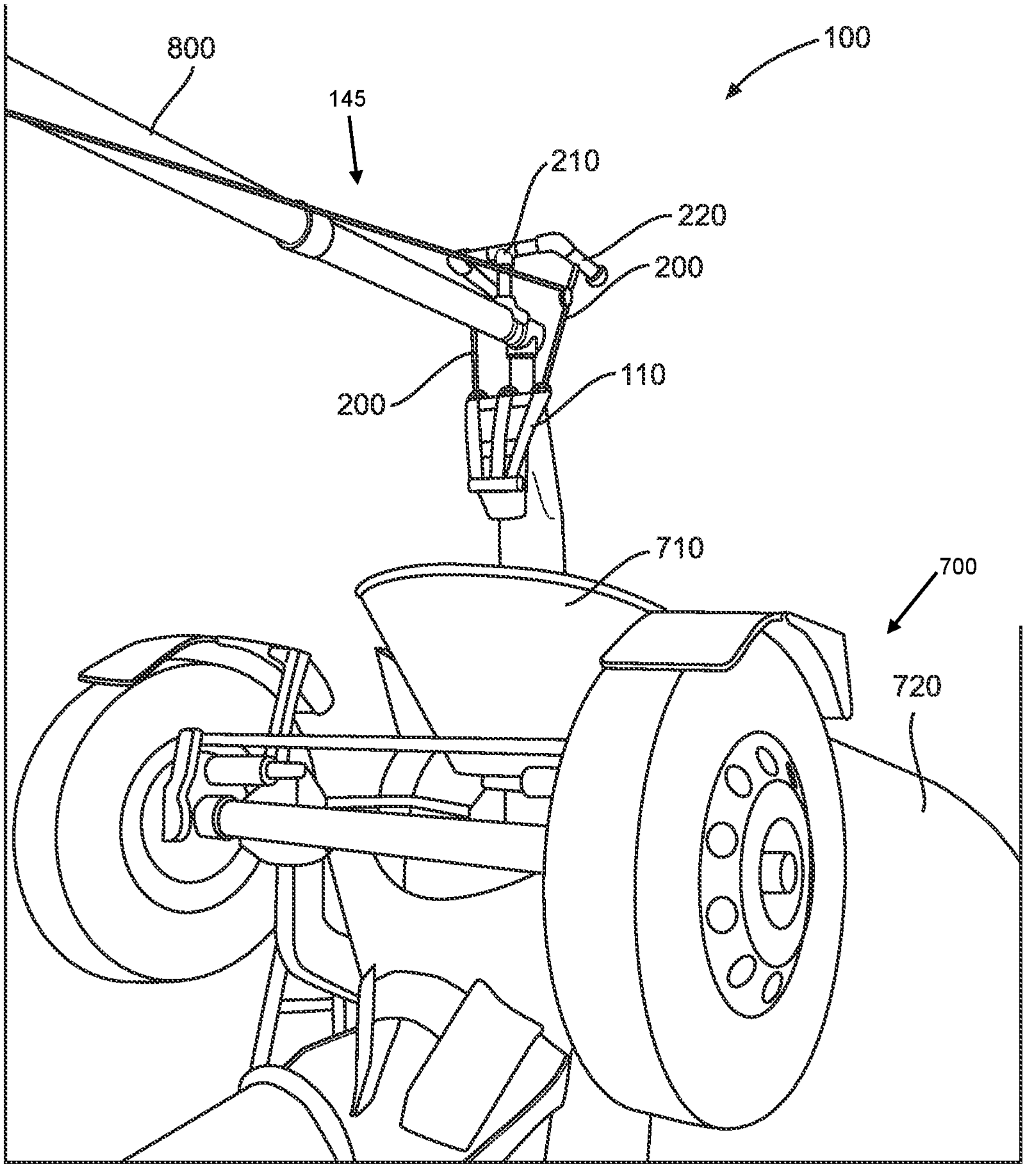
FIG. 2 is another view of the solution dispensing system as attached to a pre-existing truck wash out station frame.
Figure 3:
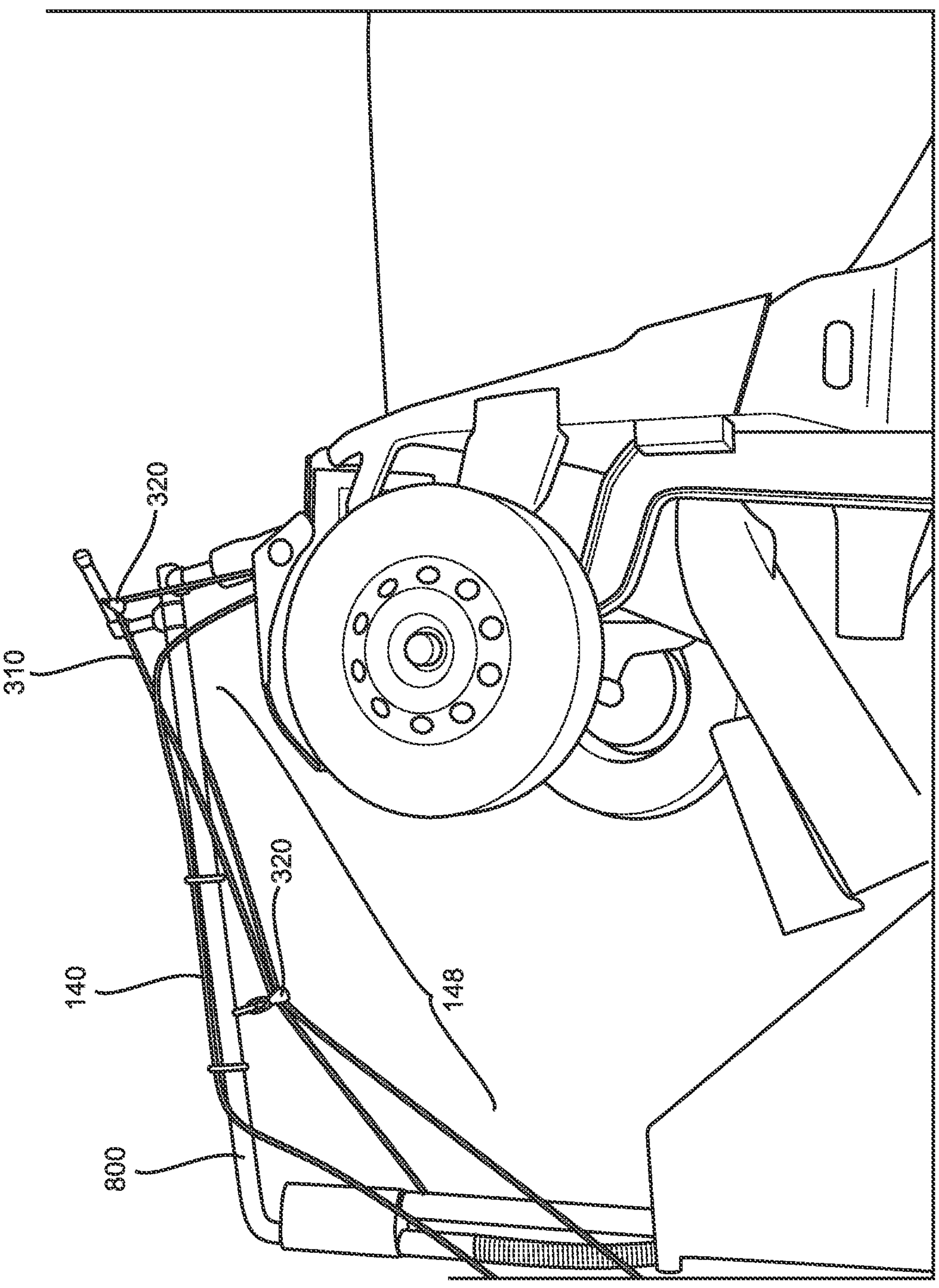
FIG. 3 is a side view of the solution dispensing system showing a solution line and portions of the guiding mechanism.
Figure 4:
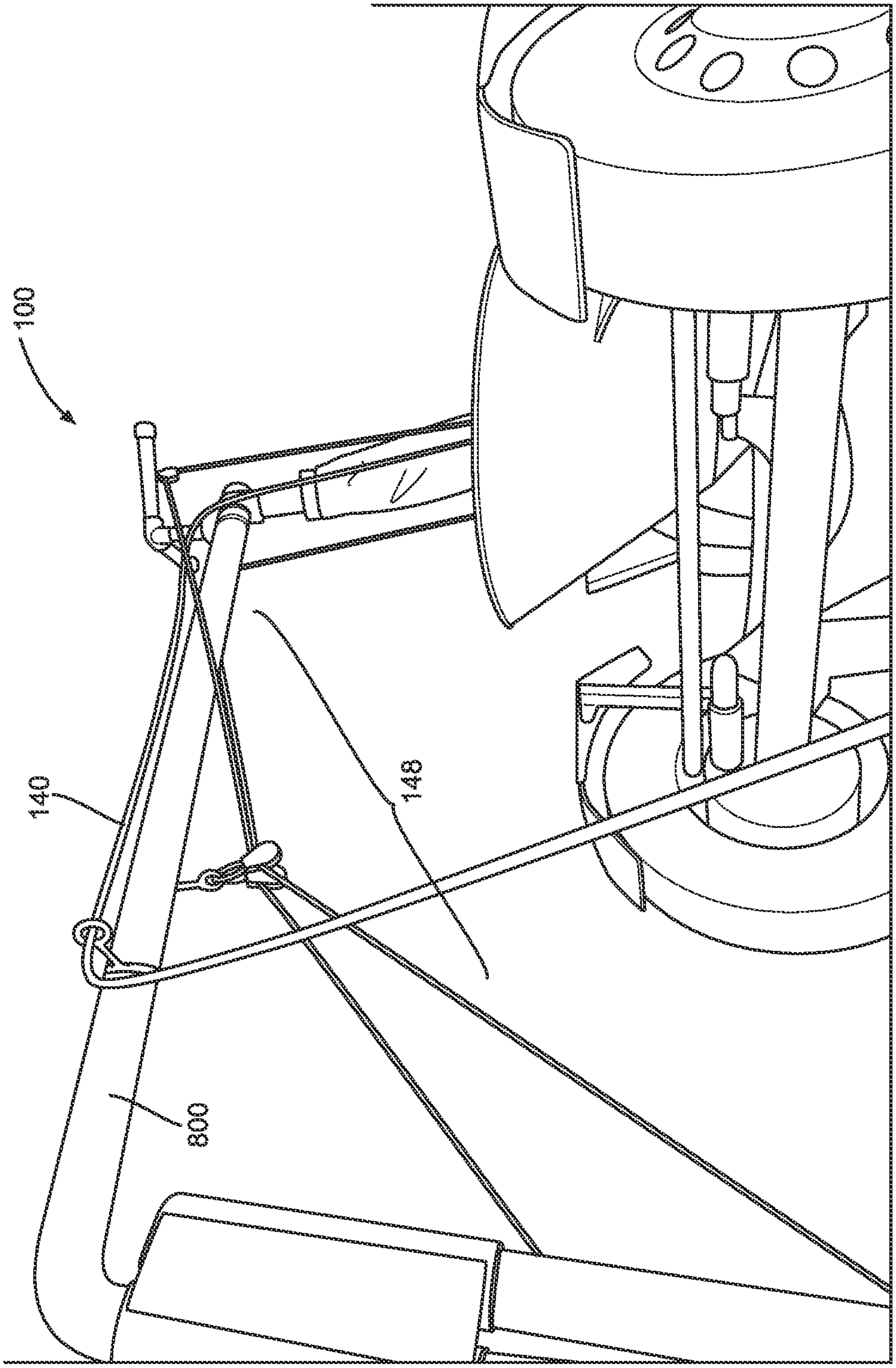
FIG. 4 is a view of parts of the solution dispensing system when the sled is lowered into a truck hopper.
Figure 5:
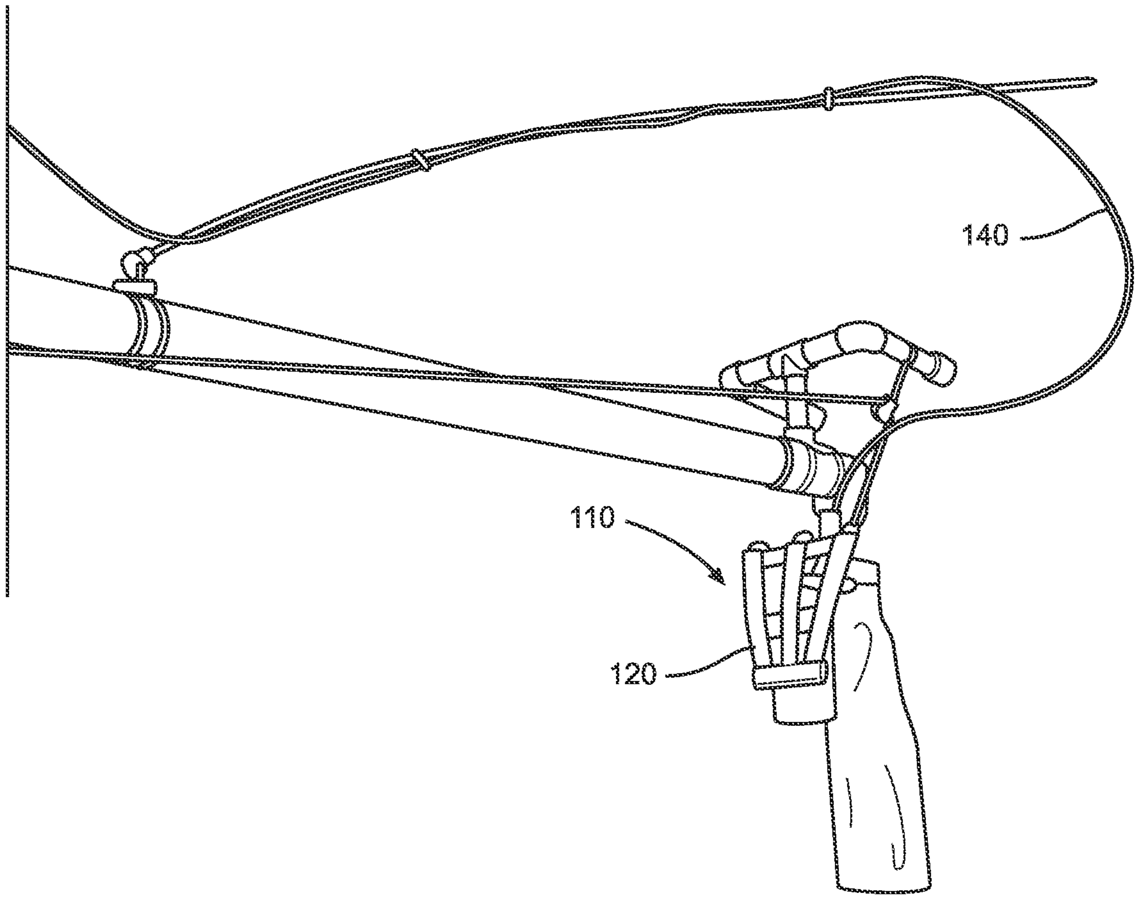
FIG. 5 is a perspective view of the solution dispensing system showing a cable management system to keep the solution line from entanglement and the sled raised.
Figure 6:
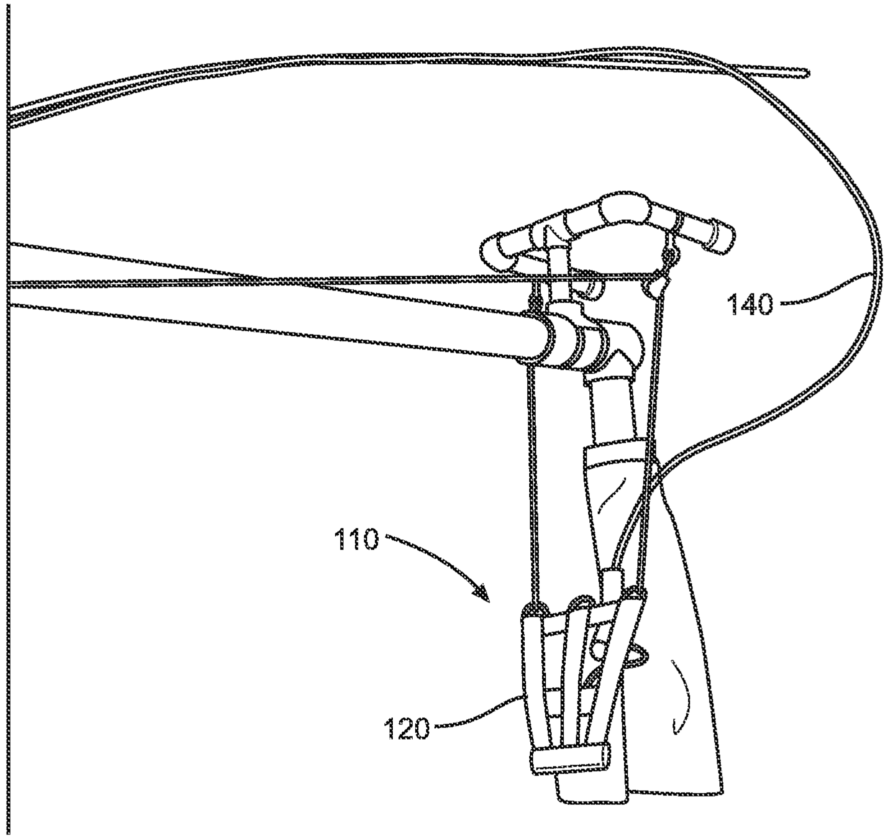
FIG. 6 shows the solution dispensing system with a sled being lowered.
Figure 7:
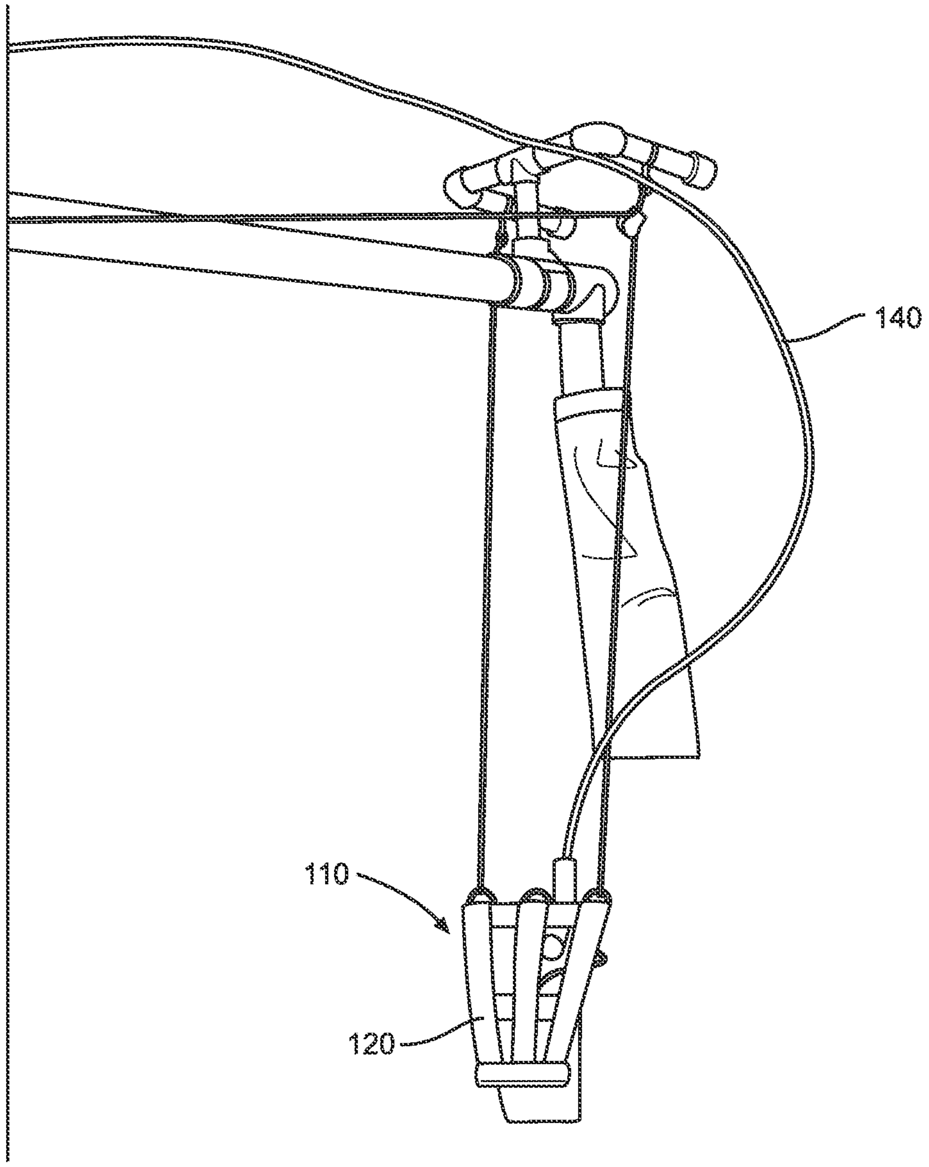
FIG. 7 shows the solution dispensing system with a sled being in a lowered position.
Figure 8:
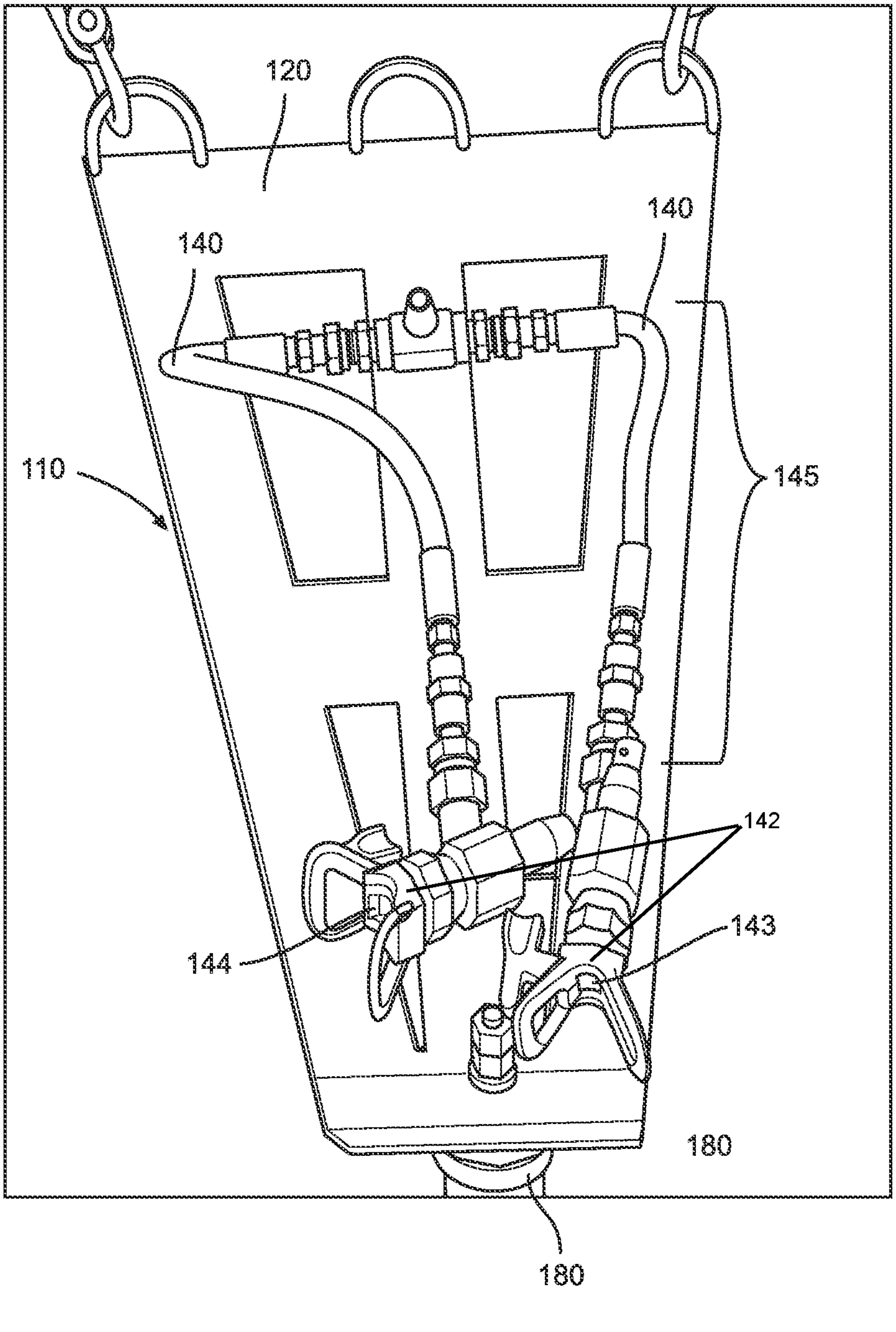
FIG. 8 shows a sled portion of the solution dispensing system, two valves and two spray heads.

Referring to FIG. 1, a solution dispensing system 100 is shown for injecting a fluid and/or a solution into a concrete mixing container 700. The system comprises a sled 110 which includes a housing 120 (shown in FIG. 6), at least one spray head 142 coupled to the housing 120, a solution line 140 coupled to the housing 120 and to the spray head 142. The spray head 142 can be adapted to spray a solution into the concrete mixing assembly 700. The solution can be a liquid, gas, any suitable form for dispensing, or combinations thereof. A plurality of couplings 200 can be used to attach the sled 110 to a guiding mechanism 148, which helps raise and lower the sled into a hopper of the concrete mixing truck as shown in FIGS. 6-7.

As shown in FIGS. 2-8, the system 100 also includes a support structure 210 adapted to attach to an external rigid frame 800. The support structure 210 terminates on one end in a bracket 220 elevated vertically and aligned with a hopper 710 of the concrete mixing container 720.

As shown in FIGS. 3-4, 13-14, and 15, the system 100 can include a guiding mechanism 148 including cables 310 and pulleys 320, wherein a control module 350 (see FIG. 15) of the system is configured to better guide the lowering and raising of the sled 110 into the hopper 710. The solution line 140 can be coupled to a fluid supply source that can include a container adapted to receive the fluid wherein a pump can be adapted to regulate a flow of the fluid. The sled 110 can be lowered to a truck hopper and a fluid is delivered to a drum of the concrete mixing container through the spray head.

As shown in FIGS. 9-12 and 15, the solution line coupled to the housing 120 can be divided into at least two valves terminating in at least two spray heads 142. For example, the system can include a first spray head 143 that can be adapted to deliver the fluid into a back of the concrete mixing container while a second spray head 144 that can be adapted to deliver the fluid at an angle and onto a wall of the concrete mixing container. The configuration of the first spray head 143 and the second spray head 144 can be such that when the concrete mixing container rotates, the fluid is evenly delivered to all walls of the mixing container. In an example, the spray heads are drip-proof spray heads and can be rotating spray heads further adapted to deliver the fluid to the entirety of the walls of the mixing container. In an example, a fitting securing the spray head to the sled 110 is welded onto the housing 120 to avoid foreign debris. The spray heads can be pressure actuated.

Figure 9:
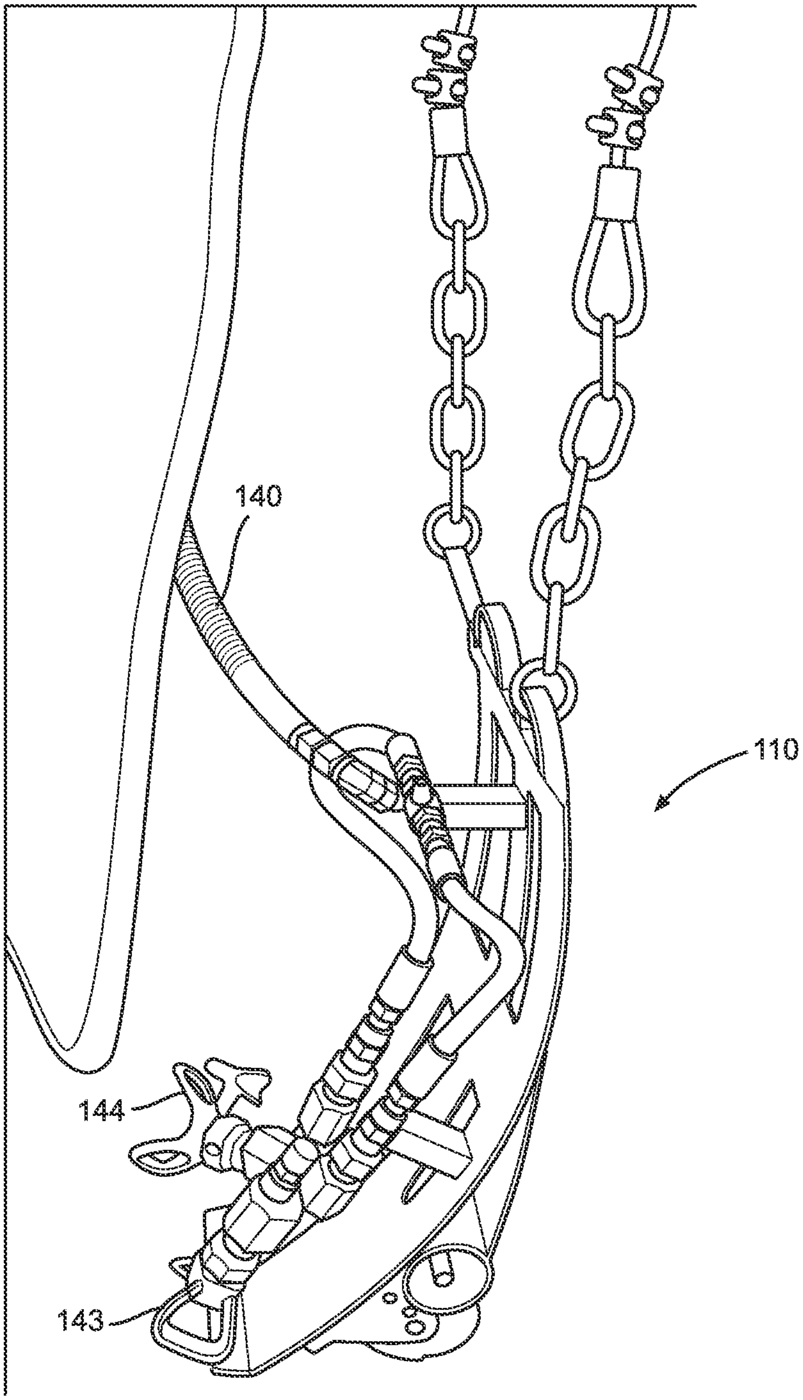
FIG. 9 shows a view of an example of a sled portion of the solution dispensing system.
Figure 10:
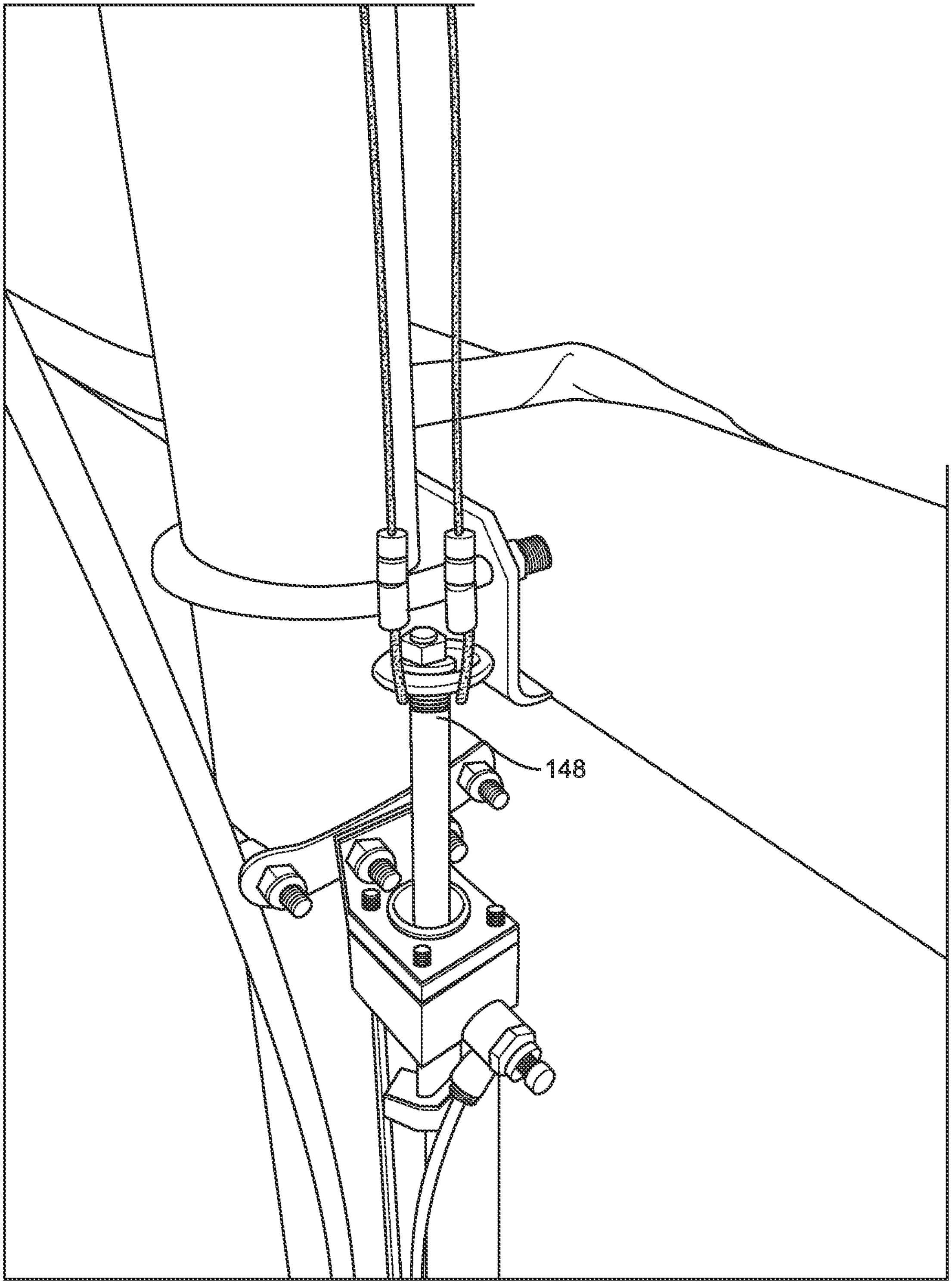
FIG. 10 is a perspective view of a portion of the guiding mechanism of the solution dispensing system.
Figure 11:
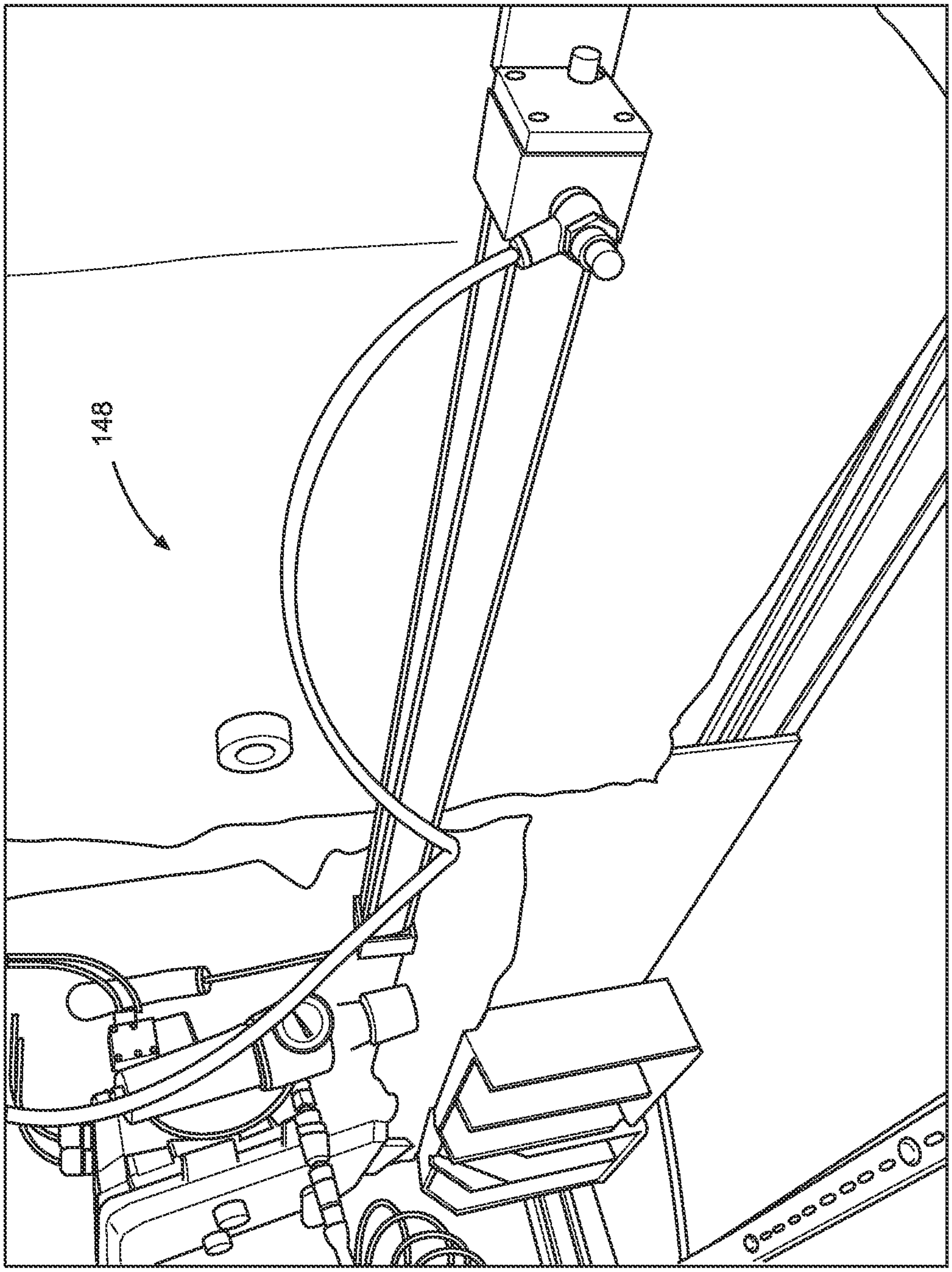
FIG. 11 is another perspective view of a portion of the guiding mechanism of the solution dispensing system.
Figure 12:
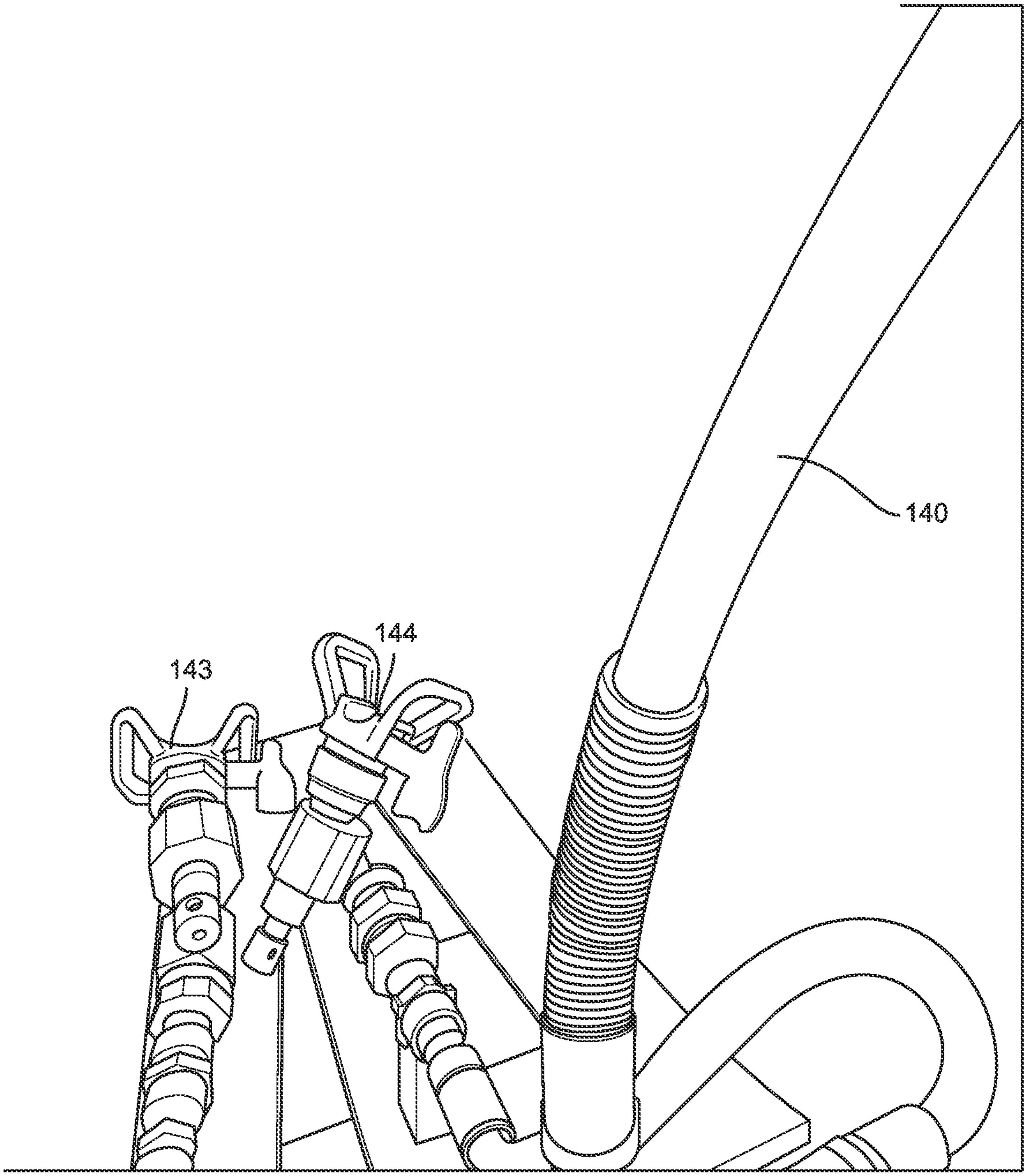
FIG. 12 shows an example of a sled and connected solution line inside a hopper where the spray heads are directed to the inside of the drum of a concrete mixing truck and delivering a solution.
Figure 13:
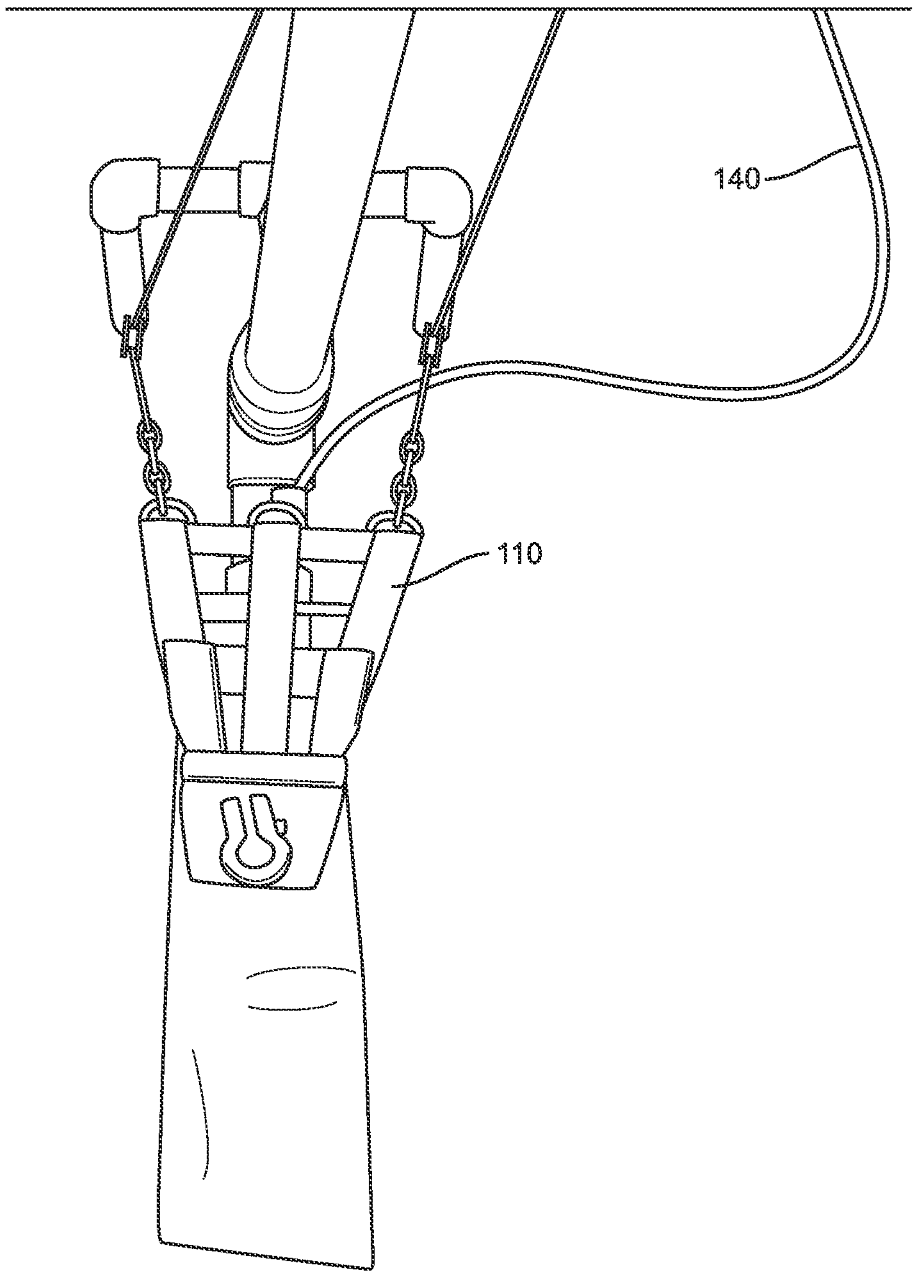
FIG. 13 shows a solution line of the solution dispensing system attached to a supporting structure and a frame of a truck wash out station.
Figure 14:
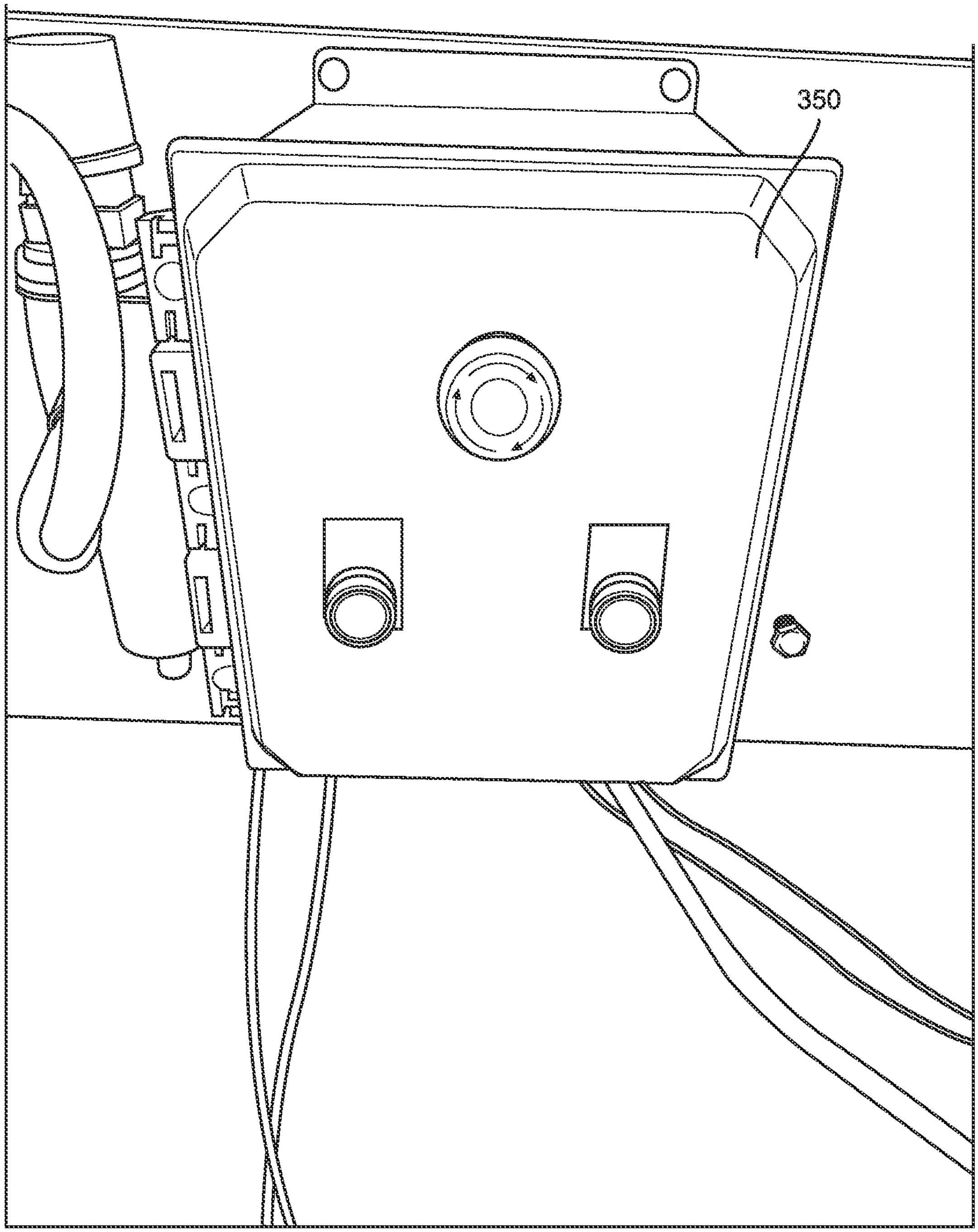
FIG. 14 shows a control module of the solution dispensing system.
Figure 15:
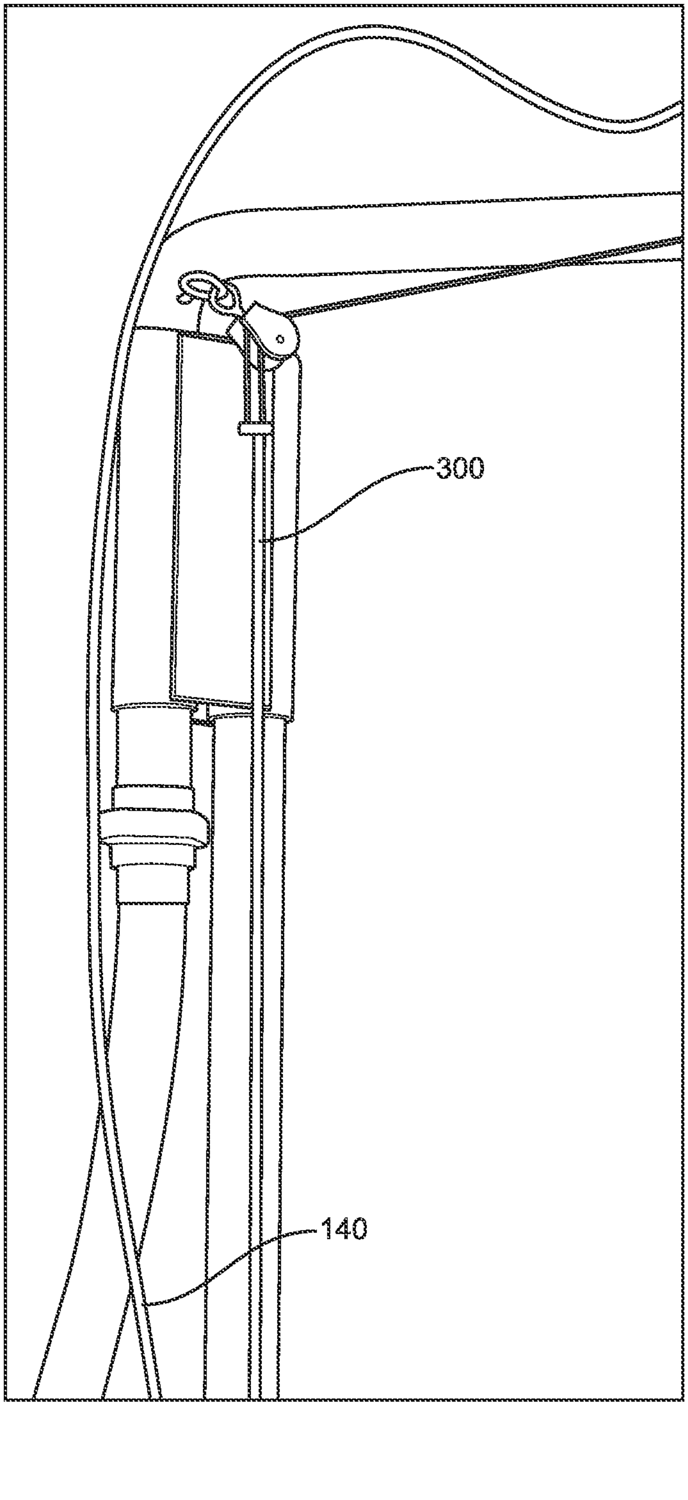
FIG. 15 shows a portion of the guiding mechanism of the present solution dispensing system.

As shown in FIG. 9, a hose management system 145 can maintain and secure the position the hose and solution line from interfering with other objects and/or tangling with each other or other objects. The hose management assembly 145 can include at least one of a semi-rigid pole coupled to the frame and coupling means to avoid an entanglement of the solution line.

The sled 110 can be attached to the guiding mechanism 148 by a chain, a cable, and/or a pulley system. The sled 110 can also include a wheel 180 coupled to a bottom face of the housing 120 for proper positioning into the hopper and to avoid friction inside the hopper once the sled is lowered into the hopper. This allows proper positioning of the sled 110 inside the hopper. The guiding mechanism 148 can include a cable, a pulley system, chains, adjustment means, clips adapted to guide the sled vertically into the hopper, and/or a directional mechanism for lowering and raising the sled into the hopper.

In an example, the solution dispensing system 100 can have a directional mechanism including an actuator, a pneumatic actuator, an electric actuator, a hydraulic actuator and/or a reel and a control module to better control the lowering and raising of the sled into the hopper, and to start, stop and/or pause the delivery of the fluid into the concrete mixing truck. This can also be adapted to control an amount of fluid dispensed and a time of dispensing the fluid. A flow-meter and/or a timer can be used to adjust an amount of fluid dispensed and time of fluid dispensed.

The solution dispensing system 100 can include a positioning mechanism such as a visual cue, a water sock, a rail, a median, a bump stop, a curb, a laser, a mirror and/or a sensor to facilitate proper alignment of the solution dispensing system with an external concrete mixing truck, the hopper and the concrete mixing container. In an example wherein pre-existing wash stations are used, the visual cue can be the water sock of the wash station. A truck driver would need to align the truck hopper with the water sock to ensure that the solution dispensing system is properly aligned with the truck for fluid delivery.

The present disclosure includes a method of dispensing a solution into a concrete mixing container including the steps of aligning a hopper of a concrete mixing truck with a positioning means of a dispensing solution system; lowering a sled of the dispensing solution system into the hopper; activating a pump and delivering a fluid into a drum of the concrete mixing truck; adjusting a flow and a quantity of fluid; stopping the flow of fluid after a desired quantity of fluid is reached; and raising and removing the sled from the hopper and from the external concrete mixing truck. In an example, the method can include the steps of attaching a support structure to an external frame; and coupling the sled to the support structure.

In an example, the present solution dispensing system utilizes ready-mix truck wash out stations and the station's pipe structures as a mounting base for the system. The wash out structures are located at every ready-mix plant and supply water to the truck drums that are rotated like a washing machine for cleaning purposes. In an example, utilizing existing wash system structures offers an optimal place to mount the system considering that application is done immediately after the wash out. This saves considerable time and costs of a new structure and if utilizing this existing structure to support the system of the present disclosure. The system includes a sled which can be lowered into the hopper after the wash out is complete. Once the sled has been lowered into place the spray cycle begins and coats the inside of the truck mixer while resting in the hopper, not in the drum. When done, the sled of the solution dispensing system is automatically raised back into its resting position behind the water sock at the top of the pipe.

There are various ways to align the trucks such that the water sock and Sled are able to align directly over the hopper of the truck including but not limited to: a K-Rail or concrete medians used to keep the tires of the truck aligned while positioning the hopper under the water sock/Sled; rails for tire alignment often used at truck loading docks and car washes; bump stops or a curb used to stop the truck in the correct place when reversing; and/or a laser beam (like on a garage door) when the beam is broken activates a notification device.

In one embodiment, the method also includes the steps of attaching a support structure to an external frame and coupling the sled to the support structure. In another embodiment, the user can attach an attachable structure to a site. Here, the attachable structure is adapted to guide the step of the lowering the sled into the hopper.

The system can include at least one pipe for solution delivery and dispensing attached to a lowering and height adjustment mechanism. In an example, the pipe can be split into 2 lines or 2 pipes terminating in 2 nozzles one to spray the top of a drum. the second to spray directly into the center of the drum. Optionally there could be a single spray head that rotates side to side. It is recommended that the drum be rotating while the Sled is dispensing utilizing the fins in the drum to assist by adjusting and moving around the atomized dispensed product resulting in better coverage.

In an example, the pipes can rest on and/or are welded to the housing which includes a wheel at the bottom portion: these pipes are generally water pipes used to discharge water into the trucks through the truck hoppers. The pipes are generally over 145 inches in height at the water discharge point and generally have a vertical and horizontal pipe(s) along with pipe fittings.

In an example, the sled actuator mechanism may rest on either the vertical or horizontal pipe and can have pulleys or other cable fed directional devices in place where the cable changes direction from horizontal to vertical. The horizontal pipe option may require an actuator support bracket in the event that the actuator length fully extended is longer, or close to as long, as the horizontal pipe (pulleys also mounted to the horizontal pipe which the cable is redirected through).

The pipe may be a water pipe or a structure using other materials used to manage the lowering and raising of the Sled into and out of the truck hoppers. In an example, the pipes and housing are coupled to a restraining mechanism, ensuring that the nozzles don't go into the drum and ready-mix portion of the truck: and a control module to control the quantity of solution delivered, and time of solution delivery. The control mechanism can control the speed of lowering and raising of the sled. The control mechanism may include a wired or wireless remote control which works in conjunction with the control box. Other features may include a pressure release button which will release the pressure off of the cable allowing for the Sled and cable to be moved up or down manually without fighting the pneumatic force.

The sled portion of the solution dispensing system can be guided through brackets mounted to the water sock or a bracket attached to the water sock or pipe or nipple where the water sock is attached to the water pipe. The chain on the sled provides adjustability for the Sled and can also be fed through a pipe(s) acting like a chain/sled guide traveling up the center or along the side(s) of the water sock or structure surrounding the water sock (skirt).

In one embodiment, the solution dispensing system for injecting a fluid into a concrete mixing container includes an attachable structure. The attachable structure helps support the sled and is adapted to help guide and lower the sled into a concrete mixing container. The attachable structure can be a prefabricated structure that would ship to a site and be assembled quickly and easily, then erected at the site to guide the sled. In some sites with stricter regulations, the addition of the attachable structure is preferred. In some embodiments, the main difference is that the trucks would pull up alongside the optional attachable structure rather than backing up under the water pipe structure into position so the Sled would be at a 90-degree angle compared to the prefabricated structure. The Sled needs to enter the truck hopper the same as when the truck backs into position.

In one embodiment the solution dispensing system includes a sled which in turn has a housing, at least one spray head coupled to said housing, and a solution line coupled to said housing and coupled to said at least one spray head adapted to spray said fluid into the concrete mixing container. The solution dispensing system can also include at least one wheel coupled to a bottom of the housing wherein the wheel affords the solution dispensing system mobility and avoids friction. The solution dispensing system can also include either a support structure adapted to attach to an external rigid frame, further include an attachable structure for the system to attach to, or a combination of both attachment to an already existing structure at the site and attachment to an attachable structure which is part of the solution dispensing system.

In one embodiment, the support structure can terminate on one end in a bracket vertically aligned with a hopper of the concrete mixing container. In other embodiments, the solution dispensing system also includes a guiding mechanism comprising a cable and at least one pulley to facilitate a raising and a lowering of the sled into the hopper of the concrete mixing container. The system can also include a supply source including a container adapted to receive the fluid and a pump adapted to regulate a flow of the fluid coupled to said solution line wherein the sled is adapted to be lowered into the hopper of the concrete mixing container and the fluid is delivered to a drum of the concrete mixing container through the spray head.

In another embodiment, the solution dispensing system can also include an attachable structure wherein the attachable structure supports the sled. In other embodiments, the system also includes a guiding mechanism comprising a cable and at least one pulley to facilitate a raising and a lowering of the sled into the hopper of the concrete mixing container. Here, the system can also include a supply source including a container adapted to receive the fluid and a pump adapted to regulate a flow of the fluid coupled to said solution line wherein the sled is adapted to be lowered into the hopper of the concrete mixing container and the fluid is delivered to a drum of the concrete mixing container through the spray head, and an attachable structure wherein the attachable structure supports the sled.

As mentioned above, other embodiments and configurations may be devised without departing from the spirit of the invention and the scope of the appended claims.

What is claimed is:

1. A solution dispensing system for injecting a fluid into a concrete mixing container, the system comprising:

a) a sled including:
   i) a housing;
   ii) at least one spray head coupled to said housing;
   iii) a solution line coupled to said housing and coupled to said at least one spray head adapted to spray said fluid into the concrete mixing container;
   iv) a plurality of coupling mechanisms to couple said sled to a guiding mechanism; and
   v) a wheel coupled to a bottom face of the housing for proper positioning into a hopper and to avoid friction inside the hopper;

b) a support structure adapted to attach to an external rigid frame wherein the support structure terminates on one end in a bracket vertically aligned with the hopper of the concrete mixing container;

c) the guiding mechanism comprising a cable and at least one pulley to facilitate a raising and a lowering of the sled into the hopper of the concrete mixing container; and d) a supply source including a container adapted to receive the fluid and a pump adapted to regulate a flow of the fluid coupled to said solution line wherein the sled is adapted to be lowered into the hopper of the concrete mixing container and the fluid is delivered to a drum of the concrete mixing container through the spray head.

2. The solution dispensing system of claim 1, wherein the solution line coupled to the housing is divided into at least two valves terminating in at least two spray heads, wherein a first spray head is adapted to deliver the fluid into a back of the concrete mixing container, wherein a second spray head is adapted to deliver the fluid at an angle and onto a wall of the concrete mixing container, wherein when the concrete mixing container rotates, the fluid is evenly delivered to all walls of the mixing container.

3. The solution dispensing system of claim 1 further comprising a plurality of drip-proof spray heads and wherein the drip-proof spray heads are rotating spray heads further adapted to deliver the fluid to an entirety of a wall of the mixing container.

4. The solution dispensing system of claim 1 wherein the sled is attached to the guiding mechanism by at least one of a chain, a cable, and a pulley system.

5. The solution dispensing system of claim 1 wherein a fitting securing the spray head to the sled is welded onto the housing to avoid foreign debris.

6. The solution dispensing system of claim 1 wherein the guiding mechanism further comprises at least one of a cable, a pulley system, chains, adjustment means, at least one clip adapted to guide the sled vertically into the hopper, and a directional mechanism for lowering and raising the sled into the hopper.

7. The solution dispensing system of claim 6 wherein the directional mechanism further comprises at least one of an actuator, a pneumatic actuator, an electric actuator, a hydraulic actuator and a reel.

8. The solution dispensing system of claim 1 further comprising a hose management assembly including at least one of a semi-rigid pole coupled to the frame and coupling means to avoid an entanglement of the solution line.

9. The solution dispensing system of claim 1 further comprising a control module configured to control a lowering and a raising of the sled, adapted to control an amount of fluid dispensed and a time of dispensing the fluid.

10. The solution dispensing system of claim 9 further comprising at least one of a flow-meter and a timer to adjust an amount of fluid dispensed and time of fluid dispensed.

11. The solution dispensing system of claim 1 further comprising a positioning mechanism including at least one of a visual cue, a water sock, a rail, a median, a bump stop, a curb, a laser, a mirror and a sensor to facilitate proper alignment of the solution dispensing system with an external concrete mixing truck, the hopper and the concrete mixing container.

12. A solution dispensing system, the system comprising:

a) a sled including:

i) a housing, ii) at least one spray head coupled to said housing, iii) a solution line coupled to said housing and coupled to said at least one spray head adapted to spray a fluid into a concrete mixing container; and iv) at least one wheel coupled to a bottom of the housing wherein the wheel affords the solution dispensing system a mobility and avoids friction.

13. The solution dispensing system of claim 12 further comprising:

i) a support structure adapted to attach to an external rigid frame wherein the support structure terminates on one end in a bracket vertically aligned with a hopper of the concrete mixing container;

ii) a guiding mechanism comprising a cable and at least one pulley to facilitate a raising and a lowering of the sled into the hopper of the concrete mixing container; and iii) a supply source including a container adapted to receive the fluid and a pump adapted to regulate a flow of the fluid coupled to said solution line wherein the sled is adapted to be lowered into the hopper of the concrete mixing container and the fluid is delivered to a drum of the concrete mixing container through the spray head.

14. The solution dispensing system of claim 12 further comprising an attachable structure wherein the attachable structure supports the sled.

15. The solution dispensing system of claim 12 further comprising:

i) a guiding mechanism comprising a cable and at least one pulley to facilitate a raising and a lowering of the sled into a hopper of the concrete mixing container;

ii) a supply source including a container adapted to receive the fluid and a pump adapted to regulate a flow of the fluid coupled to said solution line wherein the sled is adapted to be lowered into the hopper of the concrete mixing container and the fluid is delivered to a drum of the concrete mixing container through the at least one spray head; and iii) an attachable structure wherein the attachable structure supports the sled.

* * * * *